United States Patent
Roy et al.

(10) Patent No.: US 6,721,809 B1
(45) Date of Patent: Apr. 13, 2004

(54) METHOD AND APPARATUS FOR CONFIGURING EXTENSIBLE APPLICATION PROGRAMMING INTERFACES

(75) Inventors: Anindo Roy, Fremont, CA (US); M. Shoaib Lari, Palo Alto, CA (US); Sreenivas Gollupudi, Fremont, CA (US); Debashis Saha, Menlo Park, CA (US); Lakshminarayanan Chidambaran, Fremont, CA (US); Debashish Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 486 days.

(21) Appl. No.: 09/643,318

(22) Filed: Aug. 21, 2000

(51) Int. Cl.⁷ .................................................. G06F 9/00
(52) U.S. Cl. ........................................ 709/328; 709/310
(58) Field of Search ................................ 709/328, 318, 709/329

(56) References Cited

U.S. PATENT DOCUMENTS 5,819,090 A * 10/1998 Wolf et al. .................. 709/320
6,535,903 B2 * 3/2003 Yates et al. .................. 709/100

* cited by examiner

*Primary Examiner*—John Courtenay
*Assistant Examiner*—The Thanh Ho
(74) *Attorney, Agent, or Firm*—Park, Vaughan & Fleming LLP

(57) ABSTRACT

One embodiment of the present invention provides a system that modifies a function defined within an application programming interface (API) so that the function includes additional code. The system receives an additional code module to be integrated into the function within the API. The system also receives a command to integrate the additional code module into the function. This command is received through a pre-defined function within the API for integrating additional code into functions within the API. In response to the command, the system links the additional code into the function so that the additional code module is executed when the function is called. In one embodiment of the present invention, linking the additional code module into the function involves linking the additional code module as an entry function that is executed at the beginning of the function. In one embodiment of the present invention, linking the additional code module into the function involves linking the additional code module as an exit function that is executed at the end of the function. In one embodiment of the present invention, linking the additional code module into the function involves linking the additional code module as a replacement for original code for the function.

36 Claims, 4 Drawing Sheets

METHOD AND APPARATUS FOR CONFIGURING EXTENSIBLE APPLICATION PROGRAMMING INTERFACES

BACKGROUND

1. Field of the Invention

The present invention relates to application programming interfaces (APIs) for computer systems. More specifically, the present invention relates to a method and an apparatus for extending the functionality of functions defined within an application programming interface.

2. Related Art

System software designers typically define an application program interface (API) in order to define a boundary across which application software accesses services provided by an application platform, such as a database or an operating system. For example, a database system typically includes an API defining how functions that can be called to perform various database operations. Similarly, an operating system typically includes an API defining how functions can be called to perform operating system tasks.

There are a number of advantages to using an API. An API insulates the application programmer from the intricacies of the operations performed by the underlying application platform. This simplifies the task of writing application programs. Additionally, applications designed around an API are modular, because they can be used with any application platform that supports the same API. For example, application that is written to access a first database within a first computer system through an API can easily be moved to a second computer system to access a second database if the second database also supports the same API.

Unfortunately, using an API also has a number of disadvantages. Application platforms typically evolve over time. Consequently, it is often necessary to add new functionality to an API. This is typically accomplished by shipping a new version of the application platform and the associated API to the customer, so that the customer can link the new version of the application platform and API into the customer's application programs. This installation and linking process can be very inconvenient and time-consuming.

Furthermore, certain application programs may require more functionality than is provided by an API. Application platforms are also commonly used in conjunction with third party code, and this third party code often requires additional functionality that is not present in the API for the application platform. In order to provide this additional functionality, an application programmer or third party code developer must write external functions (if this is possible). Alternatively, the application programmer must somehow convince the designer of the application platform to incorporate the additional functionality into the application platform and the API. Either one of these options requires the application programmer or third party code developer to perform a large amount of work in order to make relatively minor changes to the functionality provided by functions defined within an API.

Hence, what is needed is a method and an apparatus that allows an API to be easily modified by an application programmer or a third party code developer to include additional functionality.

SUMMARY

One embodiment of the present invention provides a system that modifies a function defined within an application programming interface (API) so that the function includes additional code. The system receives an additional code module to be integrated into the function within the API. The system also receives a command to integrate the additional code module into the function. This command is received through a pre-defined function within the API for integrating additional code into functions within the API. In response to the command, the system links the additional code into the function so that the additional code module is executed when the function is called.

In one embodiment of the present invention, linking the additional code module into the function involves linking the additional code module as an entry function that is executed at the beginning of the function.

In one embodiment of the present invention, linking the additional code module into the function involves linking the additional code module as an exit function that is executed at the end of the function.

In one embodiment of the present invention, linking the additional code module into the function involves linking the additional code module as a replacement for original code for the function. In a variation on this embodiment, the system configures the additional code module to selectively call the original code for the function.

In one embodiment of the present invention, the system receives a second additional code module to be integrated into the function. Upon receiving a second command to integrate the second additional code module into the function, the system links the second additional code module into the function so that the second additional code module is executed along with the additional code module when the function is called.

In one embodiment of the present invention, linking the second additional code module into the function involves chaining the second additional code module with the additional code module so that the second additional code module is executed in sequence with the additional code module. In a variation on this embodiment, chaining the second additional code module with the additional code module involves facilitating passing at least one parameter between the additional code module and the second additional code module.

In one embodiment of the present invention, linking the additional code module into the function involves configuring the linkage to ensure that executing the additional code module does not involve recursion.

In one embodiment of the present invention, linking the additional code module into the function involves ensuring an error code is propagated back to the function.

In one embodiment of the present invention, during development of the function, the system configures the function to include callback points for receiving the additional code module.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
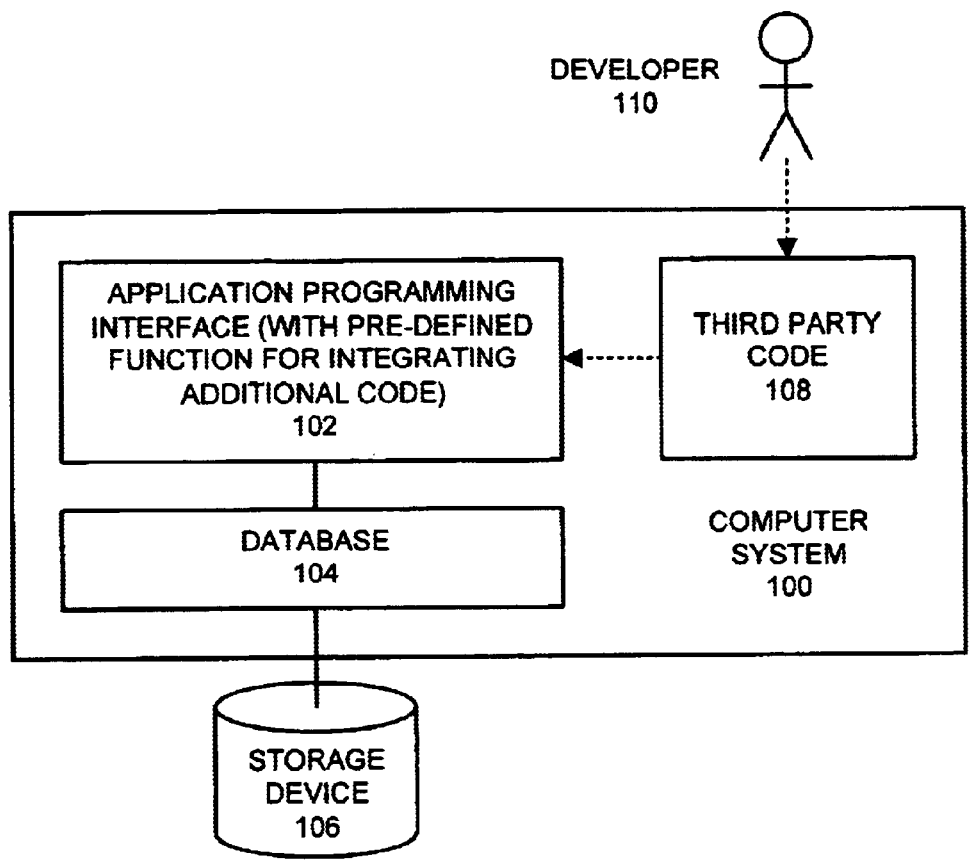
FIG. 1 illustrates a computer system including a configurable API in accordance with an embodiment of the present invention.

FIG. 1 illustrates a computer system 100 including a configurable API 102 in accordance with an embodiment of the present invention. Computer system 100 can generally include any type of computer system, including, but not limited to, a computer system based on a microprocessor, a mainframe computer, a digital signal processor, a personal organizer, a device controller, and a computational engine within an appliance.

Computer system 100 includes API 102, which defines functions to access database 104. Note that API 102 can generally include any type of API for accessing services from an application platform, and is not meant to be limited to an API for a database. For example, in an alternative embodiment of the present invention, API 102 defines functions to access services from an operating system. Note that API 102 includes a predefined function to facilitate integrating additional code into API 102.

Database 104 can include any type of system that facilitates storing data in non-volatile storage. Database 104 communicates with storage device 106. Storage device 106 can include any type of non-volatile storage device that can be coupled to a computer system. This includes, but is not limited to, magnetic, optical, and magneto-optical storage devices, as well as storage devices based on flash memory and/or battery-backed up memory.

Functions within API 102 receive third party code 108 to be integrated into functions within API 102. Third party code 108 can generally include any code that provides additional functionality for functions defined within API 102, and is not meant to be limited to code provided by a third party.

Third party code 108 is integrated into API 102 by developer 110, who makes use of the pre-defined function for integrating additional code into API 102.

Modifying a Function within an API

Figure 2:
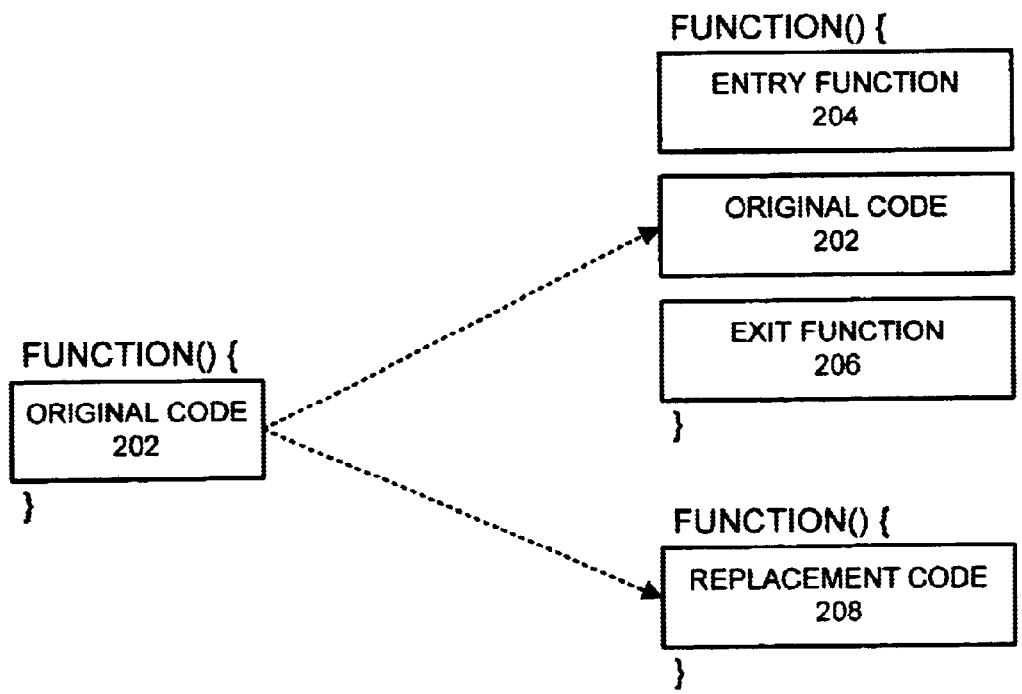
FIG. 2 illustrates options for modifying a function within an API in accordance with an embodiment of the present invention.

FIG. 2 illustrates options for modifying a function within API 102 in accordance with an embodiment of the present invention. The original function on the left-hand-side of FIG. 2 starts with original code 202, which performs an action that involves communicating with the underlying application platform. This function can be modified by incorporating an entry function 204 and/or an exit function 206 into the original function along with original code 202 (see the upper right-hand side of FIG. 2).

Entry function 204 and exit function 206 can be used to add pre-processing and/or post-processing code to the original function. For example, entry function 204 and exit function 206 can be used to add tracing and performance measurement code to the original function.

The original function can also be modified by inserting replacement code 208 in place of the original code 202 (see lower right-hand side of FIG. 2).

Figure 3:
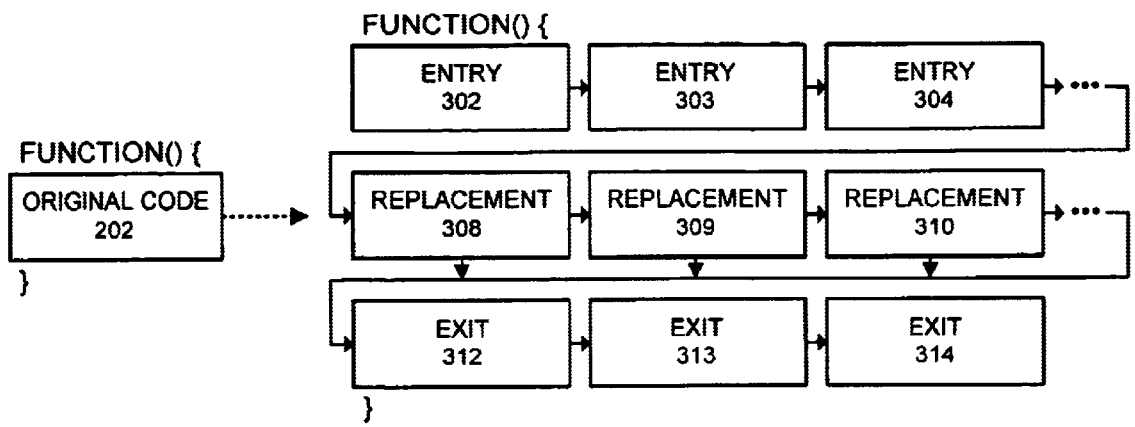
FIG. 3 illustrates in general how a function within an API can be modified in accordance with an embodiment of the present invention.

FIG. 3 illustrates in general how a function within an API can be modified in accordance with an embodiment of the present invention. This function includes a number of entry functions 302–304, which are chained together so that they execute sequentially. The function also includes a number of exit functions 312–314, which can similarly be chained together so that they execute sequentially.

Furthermore, the function includes a number of replacement functions 308–310, which can be chained together, except that these replacement functions can selectively decide whether or not to call the next replacement function in the chain. Note that the last replacement function in the chain can optionally call original code 202.

The above-described function structure is implemented by configuring each function defined within API 102 so that the function provides callback points to call entry functions, replacement functions and exit functions. A sample function structure is illustrated by the example pseudo-code in Table 1 below.

Data Structures and Code for Modifying Functions

Figure 4:
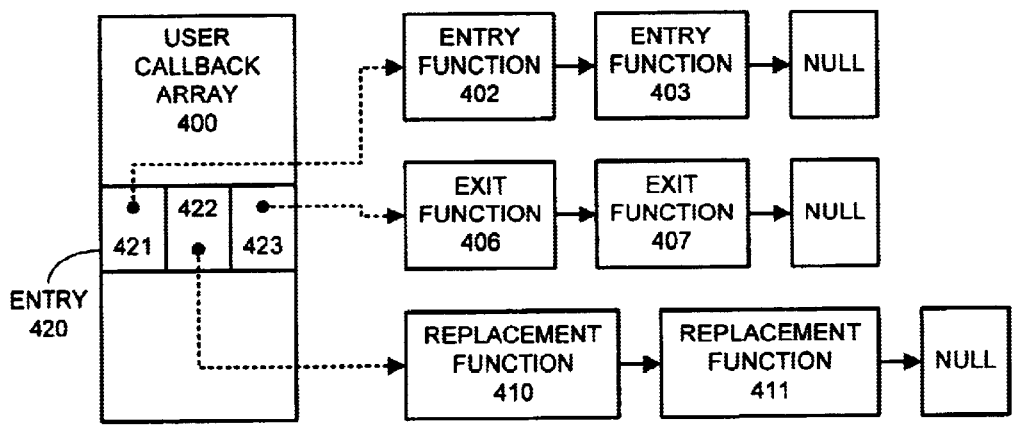
FIG. 4 illustrates a data structure involved in modifying an API in accordance with an embodiment of the present invention.

FIG. 4 illustrates a data structure that facilitates modifying API 102 in accordance with an embodiment of the present invention. The data structure illustrated in FIG. 4 includes user callback array 400, which stores references to callback functions associated with modified functions in API 102.

By referring to user callback array 400, the system is able to determine which entry functions, replacement functions and exit functions are associated with a specific modified function within API 106.

TABLE 1

```
Int APISampleCall( )
{
    ReturnStatus = PreProcessingCode (. . .,
    &ProcessingErrorNumber, . . .);
    if(ReturnStatus ! = CONTINUE)
    {
        errorcode = ProcessingErrorNumber;
        goto PostProcessing;
    }
    APISampleCall body . . .;
    errorcode = error code returned from APISampleCall body;
PostProcessing:
    ProcessingErrorNumber = errorcode;
    PostProcessingCode (. . ., &ProcessingErrorNumber, . . .);
    errorcode = ProcessingErrorNumber;
```

TABLE 1-continued

```
        return errorcode;
}
int PreProcessingCode(. . ., int *ProcessingErrorNumber, . . .)
{
    returnStatus = CONTINUE;
    /* We go thru all ENTRY callbacks irrespective of returnStatus */
    for all ENTRY callbacks do
    {
        (*entryCallback) (callbackcontext, . . .);
    }
    for all REPLACEMENT callbacks do
    {
        returnStatus = (*replacementCallback) (callbackcontext,
        &errorno, . . .);
        /* if the return Status is not CONTINUE then we
        stop processing and
            and record the error number (may be 0) */
        if (returnStatus ! = CONTINUE)
        {
                *ProcessingErrorNumber = errorno;
                break;
        }
    }
    return returnStatus;
}
int PostProcessingCode(. . ., int *ProcessingErrorNumber, . . .)
{
    returnStatus = CONTINUE;
    /* We go through all EXIT callbacks irrespective of returnStatus */
    for all EXIT callbacks do
    {
    /* Any Exit callback may decide to change the
    ProcessingErrorNumber */
                (*exitCallback) (callbackcontext,
                ProcessingErrorNumber. . .);
    }
    return returnStatus;
}
```

User callback array 400 includes a number of entries, including entry 420. Entry 420 includes three different pointers 421–423. Pointer 421 points to a NULL-terminated linked list containing structures associated with entry functions 402–403. Pointer 422 points to a NULL-terminated linked list containing structures associated with replacement functions 410–411. Pointer 423 points to a NULL-terminated linked list containing structures associated with exit functions 406–407.

Note that the each of the above-discussed structures contains a pointer to an associated callback routine, as well as a pointer to context information associated with the callback routine.

Figure 5:
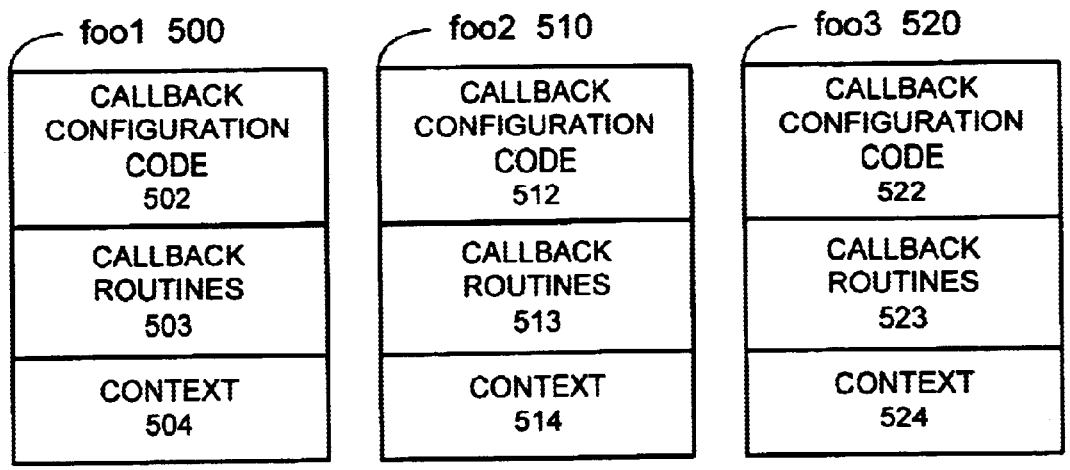
FIG. 5 illustrates code and data that can be used to modify an API in accordance with an embodiment of the present invention.

FIG. 5 illustrates code and data that can be used to modify an API in accordance with an embodiment of the present invention. FIG. 5 contains a number of modules containing code and data, including modules foo1 500, foo2 510 and foo3 520. The top portion of module foo1 500 includes callback configuration code 502. Callback configuration code 502 configures at least one function within API 102 to execute at least one routine from callback routines 503 within module foo1 500. Module foo1 500 additionally includes context 504, which contains contextual information parameters) to be provided to callback routines 503.

Similarly, module foo2 includes callback configuration code 512, callback routines 513 and context 514, and module foo3 includes callback configuration code 522, callback routines 523 and context 524. Note that the modules foo1 500, foo2 510 and foo3 500 may originate from different entities that are supplying their own code to be added to API 102.

Process of Loading Calls

Figure 6:
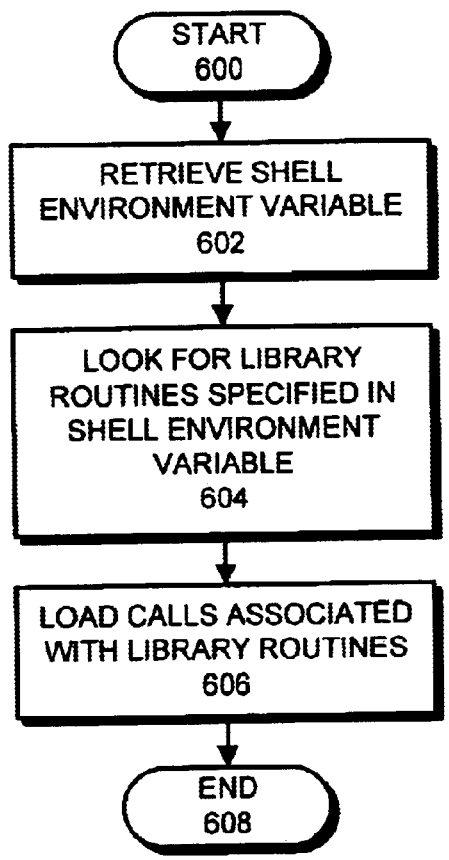
FIG. 6 is a flow chart illustrating how calls are loaded in accordance with an embodiment of the present invention.

FIG. 6 is a flow chart illustrating how calls are loaded into functions within API 102 in accordance with an embodiment of the present invention. This configuration process can take place either statically at API initialization time, or dynamically at environment initialization time for a specific process and/or user. By configuring the API at API initialization time, the API can be modified by the API designers to provide new functionality without having distribute a new API; only new code for updating the API has to be distributed. This new functionality can be implemented through callbacks to the new code within the existing functions.

In order to load the calls, the system first retrieves a shell environment variable (step 602), and then looks for any library routines that are specified in the shell environment variable (step 604). For example, the shell environment variable may contain the string "foo1;foo2;foo3", which specifies the code modules foo1 500, foo2 510 and foo3 520 which are illustrated in FIG. 5. Next, the system loads calls associated with the library routines foo1 500, foo2 510 and foo3 520 by executing callback configuration code modules 502, 512 and 522.

Process of Integrating Code into a Function

Figure 7:
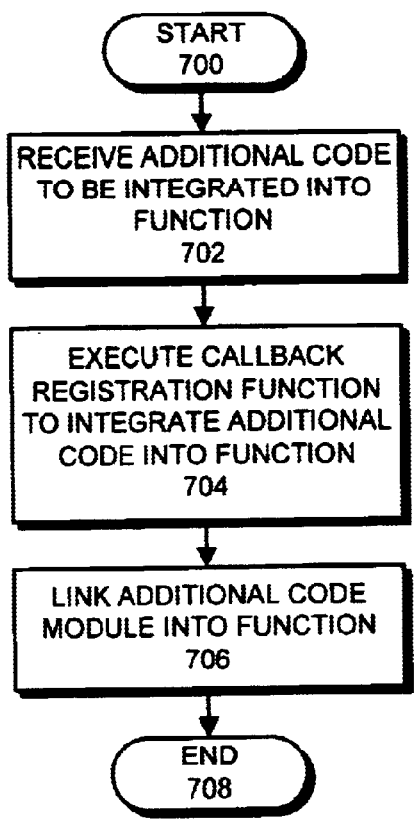
FIG. 7 is a flow chart illustrating how code is integrated into a function within an API in accordance with an embodiment of the present invention.

FIG. 7 is a flow chart illustrating how additional code is integrated into a function within an API in accordance with an embodiment of the present invention. FIG. 7 illustrates in more detail the process that takes place in step 606 of FIG. 6. After receiving a library routine module, such as module foo1 500, the system executes callback configuration code 502. While executing callback configuration code 502, the system executes at least one callback registration function to integrate additional code into a specific function within API 102. Executing this callback registration function causes the additional code to be linked into the specified function.

Figure 8:
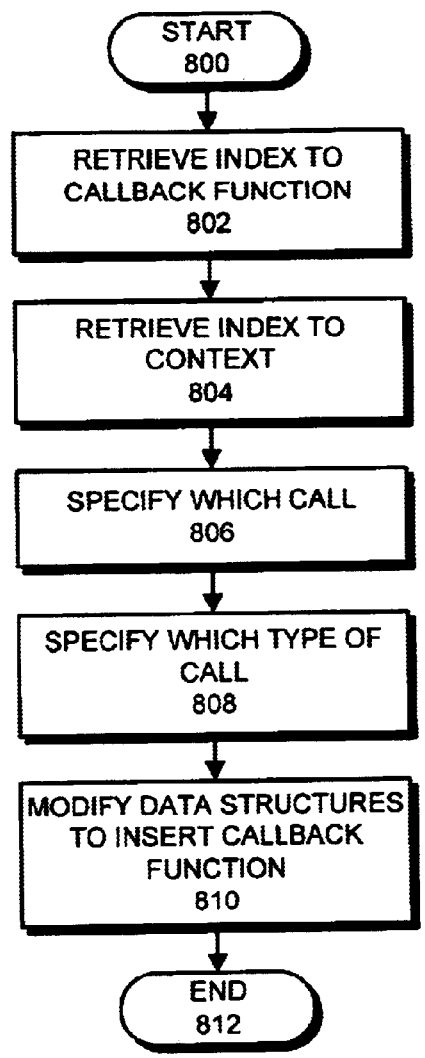
FIG. 8 is a flow chart illustrating more specifically how code is integrated into the function within the API in accordance with an embodiment of the present invention.

FIG. 8 is a flow chart illustrating more specifically how code is integrated into the specific function within the API in accordance with an embodiment of the present invention. This code is integrated into the function by using a callback registration function.

In one embodiment of the present invention, the callback registration function has the following form "CallbackRegister(cbptr, ctxptr, fcode, when, . . . )". This function takes in a number of parameters including "cbptr," which is a pointer to the callback function to be inserted into the specified API function. "ctxptr" is a pointer to context information associated with the callback function. "fcode" specifies a function within API 102 into which the callback function is to be inserted. The parameter "when" specifies the point within the specified function at which the callback function is to be inserted (entry, replacement or exit).

In executing the callback registration function, the system first retrieves an index to the callback routine, which is received as the parameter "cbptr" (step 802). Next, the system retrieves an index to the context information for the callback function, which is received as the parameter 804 (step 804). The system also retrieves the parameter "fcode" to specify which function within API 102 the callback is to be inserted into (step 806). The system also retrieves the parameter "when" which specifies when the callback is made within the specified function (entry, replacement or exit) (step 808). Finally, the function modifies data structures in order to insert the callback into the specified function (step 810). For example, the system can insert an entry function structure into the NULL-terminated linked list pointed to by pointer 421 in FIG. 4. This causes the entry function to be executed whenever the associated function is called. Note that the context pointer ctxptr is inserted into the entry function structure so that the context is associated with the function.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for modifying an existing function within an application programming interface within a computer system so that the existing function includes additional code, comprising:

receiving an additional code module to be integrated into the existing function within the application programming interface;

wherein the application programming interface defines a plurality of functions and wherein the additional code module modifies the existing function within the application programming interface;

receiving a command to integrate the additional code module into the existing function within the application programming interface;

wherein the command is received through a pre-defined function within the application programming interface for integrating additional code into existing functions within the application programming interface; and linking the additional code into the existing function within the application programming interface so that the additional code module is executed when the existing function is called;

whereby an application is able to modify the functionality of the application programming interface; and whereby the additional code modifies the existing function within the application programming interface instead of adding new functions to the application programming interface.

2. The method of claim 1, wherein linking the additional code module into the existing function involves linking the additional code module as an entry function that is executed at the beginning of the existing function.

3. The method of claim 1, wherein linking the additional code module into the existing function involves linking the additional code module as an exit function that is executed at the end of the existing function.

4. The method of claim 1, wherein linking the additional code module into the existing function involves linking the additional code module as a replacement for original code for the existing function.

5. The method of claim 4, further comprising configuring the additional code module to selectively call the original code for the existing function.

6. The method of claim 1, further comprising:

receiving a second additional code module to be integrated into the existing function within the application programming interface;

receiving a second command to integrate the second additional code module into the existing function within the application programming interface;

wherein the second command is received through the pre-defined function within the application programming interface; and linking the second additional code module into the existing function within the application programming interface so that the second additional code module is executed along with the additional code module when the existing function is called.

7. The method of claim 6, wherein linking the second additional code module into the existing function involves one of:

linking the second additional code module as a replacement for the additional code module for the existing function;

linking the additional code module as an entry function in the beginning of the existing function, so that the additional code module is executed at the beginning of the existing function; and linking the second additional code module as an exit function at the end of the existing function, so that the additional code module is executed at the end of the existing function.

8. The method of claim 6, wherein linking the second additional code module into the existing function involves chaining the second additional code module with the additional code module so that the second additional code module is executed in sequence with the additional code module.

9. The method of claim 8, wherein chaining the second additional code module with the additional code module involves facilitating passing at least one parameter between the additional code module and the second additional code module.

10. The method of claim 1, wherein linking the additional code module into the existing function involves configuring the linkage to ensure that executing the additional code module does not involve recursion.

11. The method of claim 1, wherein linking the additional code module into the existing function involves ensuring an error code is propagated back to the existing function.

12. The method of claim 1, further comprising, during development of the plurality of functions defined within the application programming interface, configuring the existing function to include callback points for receiving the additional code module.

13. A computer-readable storage medium storing instructions that when executed by a computer cause the computer to perform a method for modifying an existing function within an application programming interface within a computer system so that the existing function includes additional code, comprising:

receiving an additional code module to be integrated into the existing function within the application programming interface;

wherein the application programming interface defines a plurality of functions and wherein the additional code module modifies the existing function within the application programming interface;

receiving a command to integrate the additional code module into the existing function within the application programming interface;

wherein the command is received through a pre-defined function within the application programming interface for integrating additional code into existing functions within the application programming interface; and linking the additional code into the existing function within the application programming interface so that the additional code module is executed when the existing function is called;

whereby an application is able to modify the functionality of the application programming interface; and whereby the additional code modifies the existing function within the application programming interface instead of adding new functions to the application programming interface.

14. The computer-readable storage medium of claim 13, wherein linking the additional code module into the existing function involves linking the additional code module as an entry function that is executed at the beginning of the existing function.

15. The computer-readable storage medium of claim 13, wherein linking the additional code module into the existing function involves linking the additional code module as an exit function that is executed at the end of the existing function.

16. The computer-readable storage medium of claim 13, wherein linking the additional code module into the existing function involves linking the additional code module as a replacement for original code for the existing function.

17. The computer-readable storage medium of claim 16, wherein the method further comprises configuring the additional code module to selectively call the original code for the existing function.

18. The computer-readable storage medium of claim 13, wherein the method further comprises:
receiving a second additional code module to be integrated into the existing function within the application programming interface;
receiving a second command to integrate the second additional code module into the existing function within the application programming interface;
wherein the second command is received through the pre-defined function within the application programming interface; and
linking the second additional code module into the existing function within the application programming interface so that the second additional code module is executed along with the additional code module when the existing function is called.

19. The computer-readable storage medium of claim 18, wherein linking the second additional code module into the existing function involves one of:
linking the second additional code module as a replacement for the additional code module for the existing function;
linking the additional code module as an entry function in the beginning of the existing function, so that the additional code module is executed at the beginning of the existing function; and
linking the second additional code module as an exit function at the end of the existing function, so that the additional code module is executed at the end of the existing function.

20. The computer-readable storage medium of claim 18, wherein linking the second additional code module into the existing function involves chaining the second additional code module with the additional code module so that the second additional code module is executed in sequence with the additional code module.

21. The computer-readable storage medium of claim 20, wherein chaining the second additional code module with the additional code module involves facilitating passing at least one parameter between the additional code module and the second additional code module.

22. The computer-readable storage medium of claim 13, wherein linking the additional code module into the existing function involves configuring the linkage to ensure that executing the additional code module does not involve recursion.

23. The computer-readable storage medium of claim 13, wherein linking the additional code module into the existing function involves ensuring an error code is propagated back to the existing function.

24. The computer-readable storage medium of claim 13, wherein during development of the plurality of functions defined within the application programming interface, the method further comprises configuring the existing function to include callback points for receiving the additional code module.

25. A apparatus that modifies an existing function within an application programming interface within a computer system so that the existing function includes additional code, comprising:
the application programming interface that defines a plurality of functions;
a receiving mechanism that is configured to receive an additional code module to be integrated into the existing function within the application programming interface, wherein the additional code module modifies the existing function within the application programming interface;
a pre-defined function within the application programming interface that is configured to integrate additional code into existing functions within the application programming interface; and
a linking mechanism that is configured to link the additional code module into the existing function within the application programming interface so that the additional code module is executed when the existing function is called;
wherein the linking mechanism is configured to be activated by the pre-defined function;
whereby an application is able to modify the functionality of the application programming interface; and
whereby the additional code modifies the existing function within the application programming interlace instead of adding new functions to the application programming interface.

26. The apparatus of claim 25, wherein the linking mechanism is configured to link the additional code module as an entry function that is executed at the beginning of the existing function.

27. The apparatus of claim 25, wherein the linking mechanism is configured to link the additional code module as an exit function that is executed at the end of the existing function.

28. The apparatus of claim 25, wherein the linking mechanism is configured to link the additional code module as a replacement for original code for the existing function.

29. The apparatus of claim 28, wherein the linking mechanism is configured to link the additional code module so that the additional code module selectively calls the original code for the existing function.

30. The apparatus of claim 25:
wherein the receiving mechanism is configured to receive a second additional code module to be integrated into the existing function within the application programming interface;
wherein the pre-defined function is configured to receive a second command to integrate the second additional code module into the existing function within the application programming interface; and
wherein the linking mechanism is configured to link the second additional code module into the existing function within the application programming interface so that the second additional code module is executed along with the additional code module when the existing function is called.

31. The apparatus of claim 30, wherein the linking mechanism is configured to selectively do one of the following:

link the second additional code module as a replacement for the additional code module for the existing function;

link the additional code module as an entry function in the beginning of the existing function, so that the additional code module is executed at the beginning of the existing function; and to link the second additional code module as an exit function at the end of the existing function, so that the additional code module is executed at the end of the existing function.

32. The apparatus of claim 30, wherein the linking mechanism is configured to chain the second additional code module with the additional code module so that the second additional code module is executed in sequence with the additional code module.

33. The apparatus of claim 32, wherein the linking mechanism is configured to facilitate passing at least one parameter between the additional code module and the second additional code module.

34. The apparatus of claim 25, wherein the linking mechanism is configured to ensure that executing the additional code module does not involve recursion.

35. The apparatus of claim 25, wherein the linking mechanism is configured to ensure an error code is propagated back to the existing function.

36. The apparatus of claim 25, wherein the existing function is configured to include callback points for receiving the additional code module.

* * * * *